United States Patent [19]
Link

[11] Patent Number: 4,482,037
[45] Date of Patent: Nov. 13, 1984

[54] LUBRICATING CONTROL SYSTEM FOR CLUTCHES

[75] Inventor: Achim Link, Schweinfurt, Fed. Rep. of Germany

[73] Assignee: Fichtel & Sachs AG

[21] Appl. No.: 397,139

[22] Filed: Jul. 12, 1982

[30] Foreign Application Priority Data

Jul. 15, 1981 [DE] Fed. Rep. of Germany ....... 3127875

[51] Int. Cl.³ ..................... F16D 13/74; B60K 41/22
[52] U.S. Cl. ................... 192/3.58; 192/70.12; 192/113 B
[58] Field of Search ............ 192/113 B, 113 R, 70.12, 192/3.51, 3.52, 3.57, 3.58, 995

[56] References Cited

U.S. PATENT DOCUMENTS

| 3,822,770 | 7/1974 | Golan | 192/113 B |
| 3,862,676 | 1/1975 | Schall | 192/113 B |

FOREIGN PATENT DOCUMENTS

| 1389515 | 4/1975 | United Kingdom. |
| 1573328 | 8/1980 | United Kingdom. |
| 2018369 | 3/1982 | United Kingdom. |

Primary Examiner—George H. Krizmanich
Assistant Examiner—M. Manley
Attorney, Agent, or Firm—Toren, McGeady and Stanger

[57] ABSTRACT

A clutch system for an oil-lubricated clutch mechanism including an oil reservoir, oil pump means, and a control valve device whereby oil from the reservoir is directed to the clutch when the clutch is engaged, with the oil being returned to the reservoir when the clutch is disengaged, the control valve device being operated by fluid pressure such as compressed air.

3 Claims, 4 Drawing Figures

LUBRICATING CONTROL SYSTEM FOR CLUTCHES

The present invention is related generally to oil-lubricated clutches, and more particularly to a lubrication system for clutches which operate to engage and disengage an engine and transmission gearing of motor vehicles.

The system to which the present invention relates is particularly applicable to the lubrication of clutch mechanisms including clutch discs which are engaged during operation of the vehicle and which are lubricated with a flow of lubricating oil delivered thereto by means of an oil pump from an oil reservoir. In the system of the invention, oil flow may be interrupted during the time that the clutch is disengaged thereby to avoid a drag moment on the clutch.

In oil-lubricated clutches of the type to which the present invention relates, flow of oil is constantly maintained to the clutch discs in order to reduce wear and to cool the clutch mechanism. When the transmission of the vehicle is operated, for example for shifting of the transmission gears, the clutch is disengaged and the power train between the engine and the transmission is thus interrupted. During this shifting operation, oil supply to the clutch discs must be interrupted in order to avoid the development of a drag moment which would otherwise appear in the clutch mechanism and which would hinder rapid and smooth shifting from one gear to another.

After the gears have been shifted, the clutch is once again engaged and when this occurs, the full flow of lubricating oil is again required at the clutch discs in order to eliminate heat which is generated by frictional forces and in order thereby to reduce wear on the clutch discs. Exact control of the flow of oil is thus necessary for proper clutch functioning and to extend the service life of the clutch.

In clutches which are in general use, the flow of oil is produced by means of an oil pump which is integrated into the releasing gear. The oil pump which is usually a geared pump receives oil from an oil reservoir and discharges the oil against an oil collecting trough arranged around the clutch discs. From this oil collecting trough, the oil finally flows over suitable apertures to the clutch discs. When the clutch is operated to change gears, that is, when the clutch is disengaged by means of the clutch releasing mechanism, the outlet of the oil pump together with the releasing gear will move out of the range of the oil collecting trough so that the oil bypasses the trough and no oil flows to the clutch discs.

During engagement of the clutch, that is, when the clutch is thrown in, the oil pump together with the releasing gear is again disposed in the range of the oil collecting trough so that lubricating oil can flow again to the clutch discs.

In view of the constantly increasing demands upon clutches, a design of this type has been found as no longer effective to reduce wear of the clutch discs because of the late arrival of the oil at the clutch discs during their engagement. Because of the path-dependent release of the oil flow, the oil arrives at the clutches only when the clutches are at least partially engaged again so that the first contact of the clutch plates occurs while the plates are dry and therefore without sufficient cooling.

The present invention is directed toward a system for controlling the flow of oil to an oil-lubricated clutch so that the oil flow will be interrupted during disengagement of the clutch and will be again restored during clutch engagement.

SUMMARY OF THE INVENTION

Briefly, the present invention may be described as a clutch system including a clutch mechanism having clutch discs adapted to be engaged and disengaged for controlling power transmission between the engine and transmission gearing of a motor vehicle comprising oil reservoir means containing lubricating oil for said clutch mechanism, oil pump means for delivering said oil from said reservoir means to said clutch mechanism to effect lubrication thereof and control valve means operatively associated with said oil pump means for interrupting oil flow to said clutch mechanism when said clutch mechanism is disengaged and for restoring said oil flow when said clutch mechanism is engaged.

In a more specific aspect of the invention, the control valve means may comprise a control valve and fluid pressure means for controlling operation of the control valve. The system includes means defining oil flow paths from the reservoir means to the control valve, from the control valve to the clutch mechanism, and from the control valve back to the reservoir means. The fluid pressure means are operated in response to the condition of the clutch mechanism in order to direct oil through the control valve to the clutch mechanism when the clutch mechanism is engaged and through the control valve back to the reservoir means when the clutch mechanism is disengaged.

Thus, in accordance with the present invention, the problems arising with prior art devices are avoided in that the control valve is associated with the oil pump which interrupts the oil flow during disengagement of the clutch mechanism and restores it again when the clutch is re-engaged. In the preferred embodiment of the invention, the control valve is associated with the oil pump at its pump outlet and is pneumatically operated. Furthermore, control of the control valve is effected by contacts which are associated with the clutch control, e.g., the clutch pedal, and the transmission control, e.g., the transmission shift lever, whereby the control valve will block oil flow to the clutch discs during operation (disengagement) of the clutch and release it again during operation of the transmission (placing it into gear).

The operation is so designed that a compressed air valve is associated with the pneumatic control valve for its operation and that control of this compressed air valve is effected by means of electrical pulses. The electrical pulses for controlling the compressed air valve are generated by means of electrical contacts which are associated with the clutch control, e.g., the clutch pedal, and with the transmission control, e.g., the transmission shift lever. These measures ensure control of the oil pump which is independent of the path of the releasing gear. When the control valve is operated, it clears in the oil pump an outlet port which conducts the major part of the oil flow into the clutch housing and thus away from the clutch discs. During shifting, which is effected as known when the clutch is disengaged, oil flow is thus interrupted and drag moment on the clutch is reduced to a minimum.

When the transmission is placed into gear, a new control pulse is released and the full oil current arrives again at the clutch discs. In the last engagement, the full flow of oil current is then available at the clutch discs so that the resulting frictional heat is eliminated and wear is avoided.

The control valve is arranged at the pump outlet in order to conserve space and it is integrated into the pump. It is thus possible to utilize existing structural parts without major expenditures and to utilize existing space in the clutch. This arrangement of the valve in the pump at the pump outlet thus results in a simple structural configuration and in space-saving advantages.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
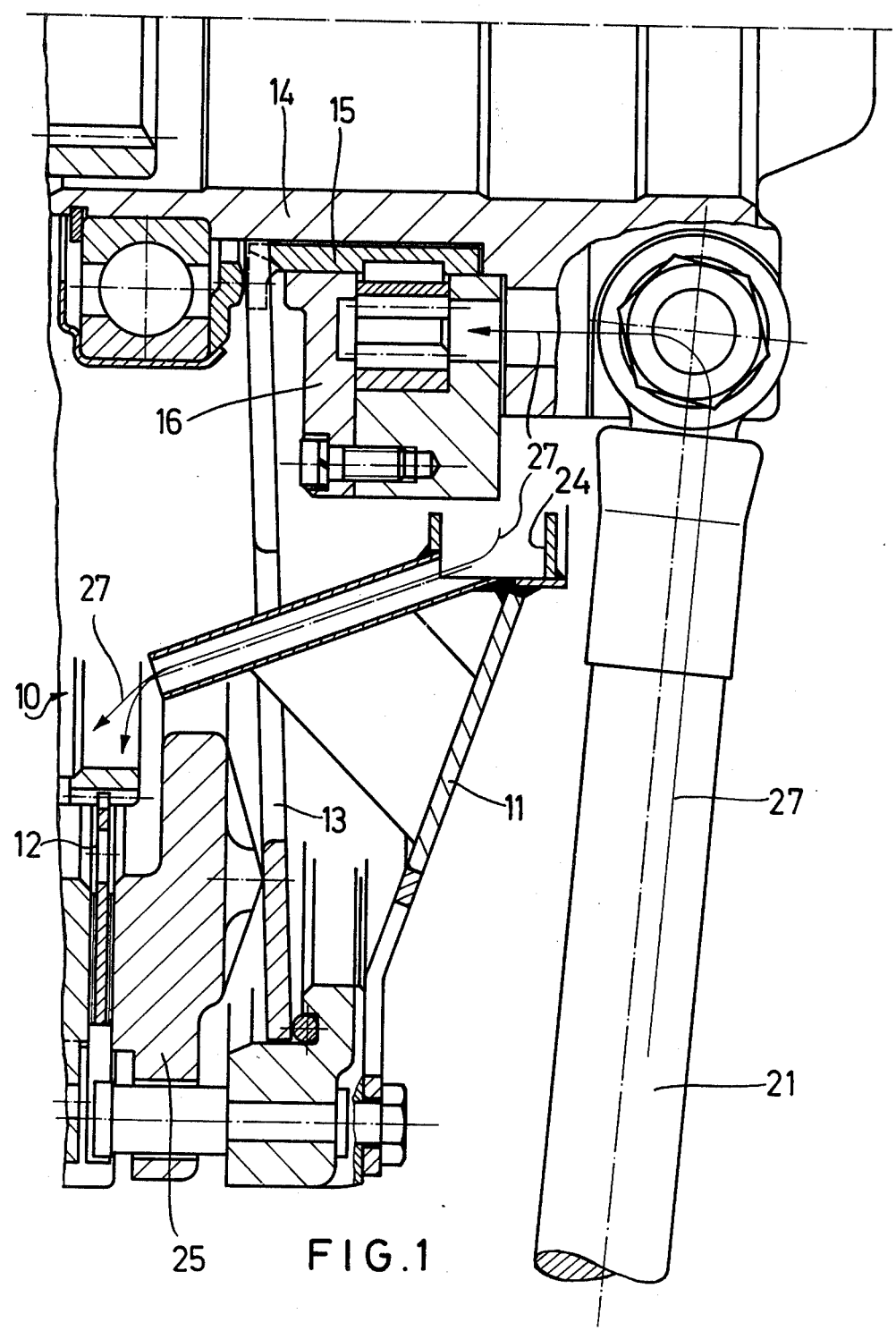
FIG. 1 is a schematic sectional view taken through a disc clutch with an oil pump and with oil flow guide means operating through an oil collecting trough.

Referring now to the drawings wherein similar reference characters are used to identify similar parts throughout the figures thereof, there is shown particularly in FIG. 1 a clutch mechanism 10 which consists essentially of a clutch housing 11 wherein clutch discs 12 are held in engagement by means of a diaphragm cup spring 13 and a pressure plate 25. The clutch mechanism 10 is operated through a releasing gear 14 which includes a sliding sleeve 15 acting on the cup spring 13. Associated with the releasing gear 14 is an oil pump 16 which is designed as a geared pump.

During operation of the mechanism depicted in FIG. 1, the oil pump 16 produces an oil current 27 which is collected in a circumferential oil collecting trough 24 and which is conducted to the clutch discs 12. The oil is drawn from a oil tank or reservoir 26 through a suitably designed oil feed conduit 21.

Figure 2:
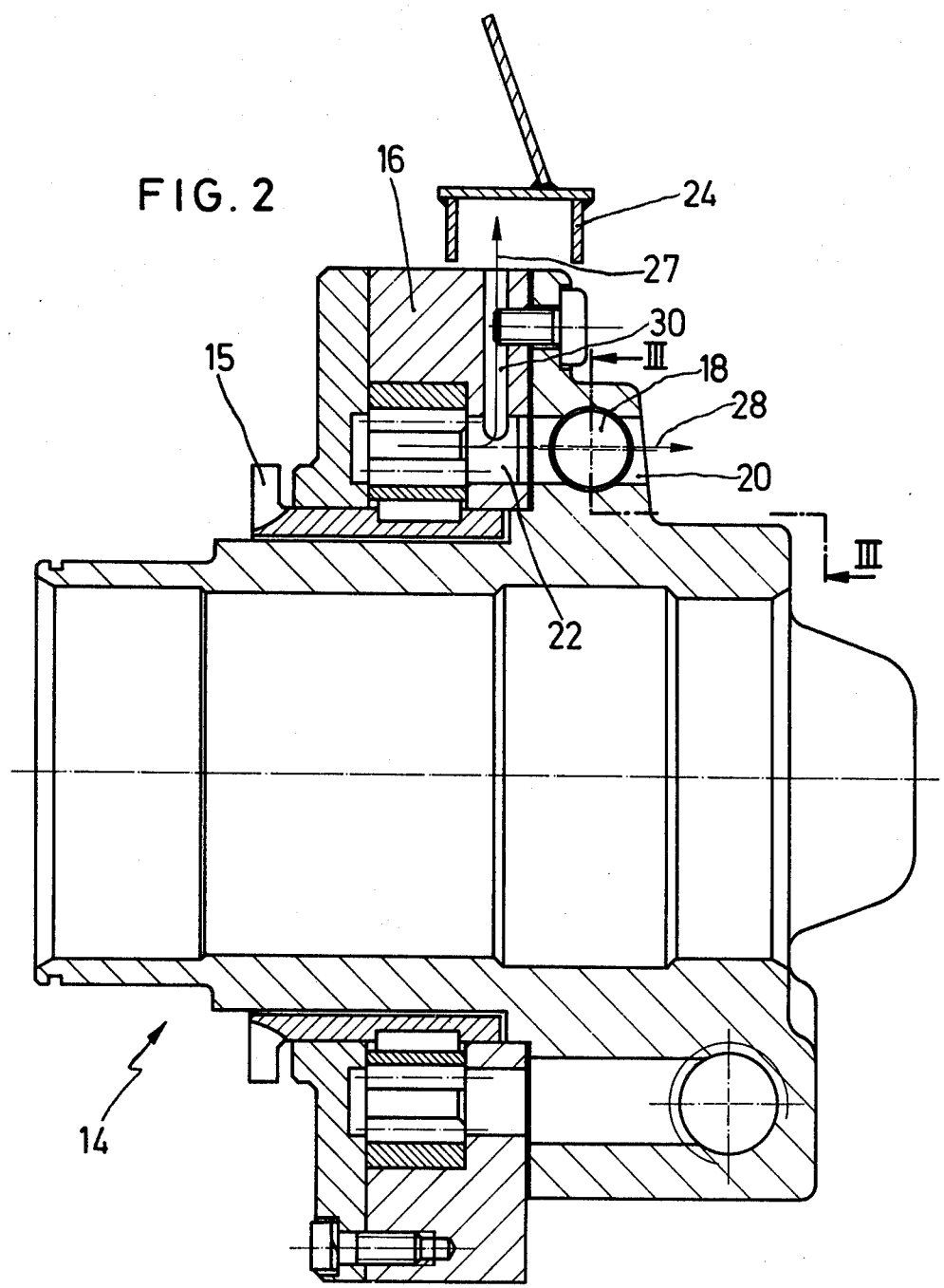
FIG. 2 is a sectional view showing the releasing gear with an integrated oil pump and associated control valve means.

The oil pump 16 is shown in greater detail in FIG. 2, and a control valve 18 is provided at a pump outlet 22 for controlling the oil current 27. When the control valve 18 is closed, the oil current 27 is conveyed toward the oil collecting trough 24 and is thus directed to the clutch discs 12. When the control valve 18 is opened, a return current 28 is produced which directs the oil flow back to the oil tank or reservoir 26. At this time, the oil current flow 27 is interrupted.

Figure 3:
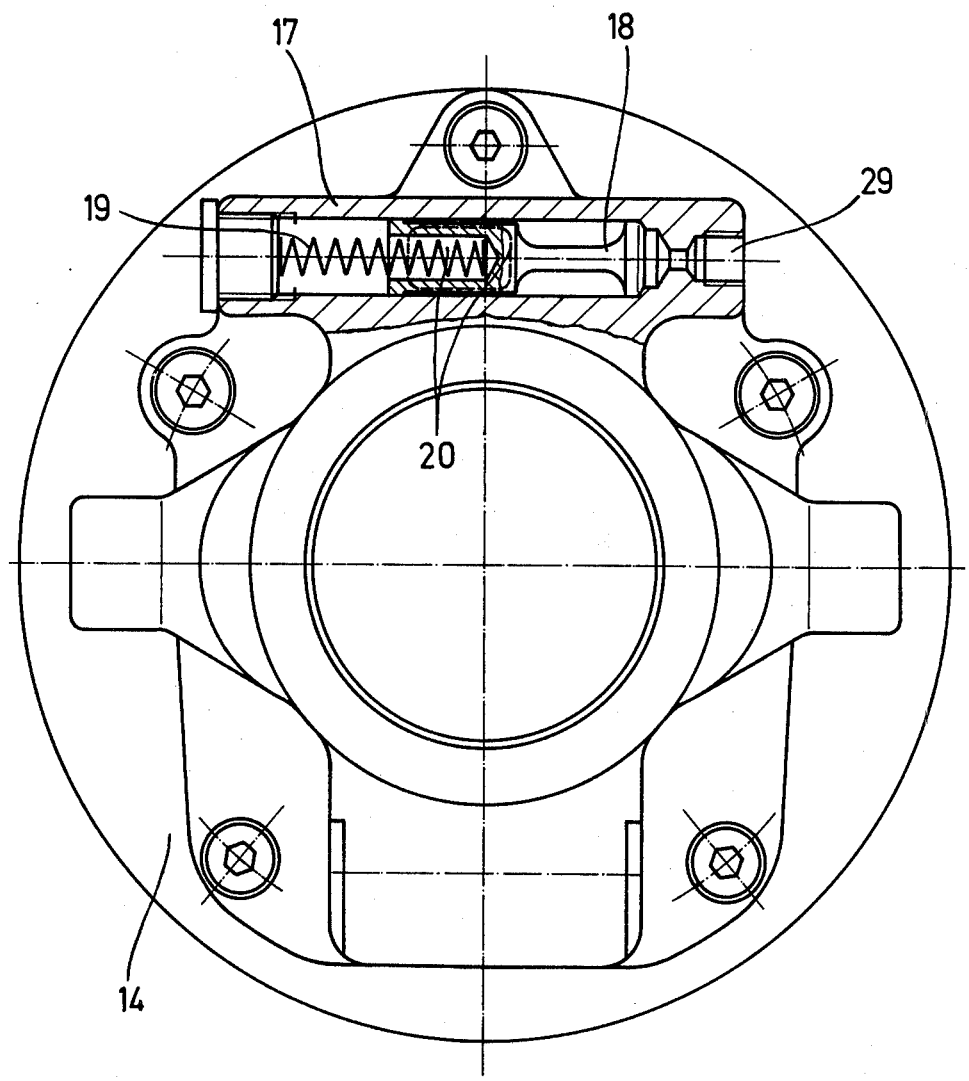
FIG. 3 is a sectional top view showing the releasing gear according to FIG. 2 with the control valve, the view taken along the line III—III of FIG. 2.

As best seen in FIG. 3, the control valve 18 is arranged in a valve housing 17 which is provided on one side with a compressed air connection 29 through which compressed air may be applied to act against the control valve 18. The control valve 18 is designed as a reciprocating slide valve and on the side thereof opposite the compressed air connection 29 there is provided a valve spring 19 which acts as a compression spring. The spring 19 pushes the control valve 18 back to its starting position as soon as the application of the compressed air supply has terminated.

In the valve housing 17 there is provided an outlet port 20 which may be opened or closed by the control valve 18. With the outlet port 20 open, the oil pump 16 will produce a return flow of oil back to the tank or reservoir 26. When the outlet port 20 is closed by the control valve 18, the oil flow is conveyed through an oil channel 30 provided in the oil pump 16, and the lubricating oil will thus be applied at the clutch discs 12.

Figure 4:
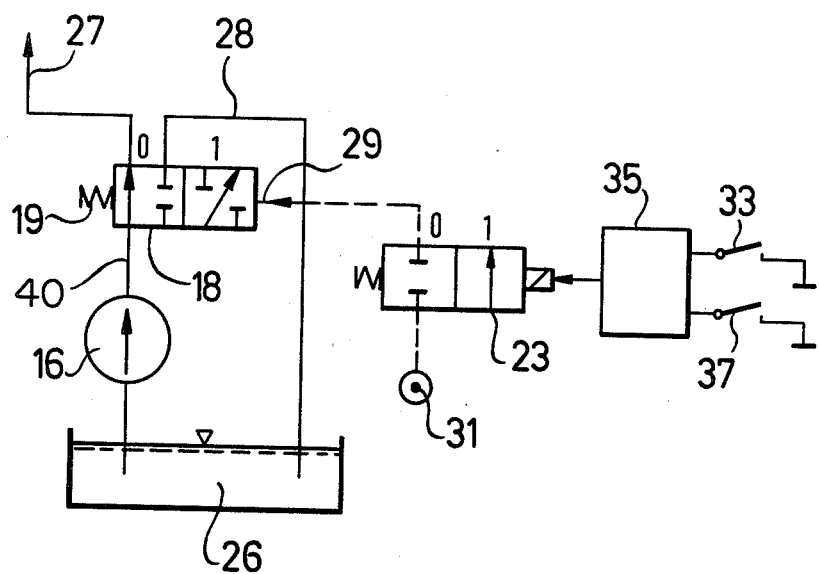
FIG. 4 is a schematic diagram showing the control system in accordance with the invention.

The control system for controlling the control valve 18 is shown in FIG. 4 in schematic form. During normal operation, the oil pump 16 delivers oil from the oil tank 26 in order to develop an oil current 27 which is directed through suitable means to the clutch discs 12. During disengagement of the clutch, e.g., when the clutch is opened by operation of a clutch pedal (not shown), a contact 33 of an electrical control stage 35 is closed and an electrical pulse is transmitted to the compressed air valve 23. The compressed air valve 23 will then establish a connection between a compressed air source 31 and the compressed air connection 29 on the control valve 18. The oil current flow is then blocked, as previously described, and the return flow of oil current 28 back to the oil reservoir 26 is established.

Shortly before the clutch is again engaged, for example when another electrical impulse is generated by a second contact 37 of the electrical control stage 35 associated with a shift lever of the transmission, the compressed air valve 23 is again closed. The connection of the compressed air source 31 and the compressed air connection 29 is interrupted and the valve spring 19 operates to push the control valve 18 back into its starting position. The return current 28 of oil back to the oil reservoir 26 is thus interrupted and the oil current 27 is again established. The oil pump 16 will then convey oil in this control position, as shown in FIG. 4, from the oil reservoir 26 to the clutch mechanism 10. Control stage 35 may be a bistable multivibrator. As a connection to the control valve 18 there is provided a flexible hose 40 which can compensate for axial movement of the oil pump during shifting.

This hose 40 must be suitable for the high temperatures and pressures which may occur. During the time that the hose is located in the area of the clutch mechanism 10, damage thereto should be avoided in order to prevent the hose from being worn through.

The wiring of the contacts for the control of the compressed air valve 23 which is indicated in FIG. 4 consists of one possible preferred embodiment of the invention. However, it is also possible to deflect the flow of oil current when the clutch pedal is pressed down. Oil current 27 is then interrupted even sooner and the drag moment between the flywheel of the engine and the clutch discs is positively prevented or reduced to a minimum. Similarly, the contact for releasing the oil current 27 may also be arranged so that full oil current flow is available after each engagement of the gears for cooling the clutch linings during start which will generate the most heat.

Thus, from the foregoing description, it will be seen that the present invention essentially comprises a control valve 18 for directing an oil current flow 27 to clutch discs 12 of a clutch mechanism 10. The control valve 18 is operated by means of an electrically controlled compressed air valve 23 and the valve 18 is associated with the oil pump 16. As a result of the system of the invention, a continuous supply of oil current 27 may be deflected in order to establish a return current 28 whereby oil may flow back to the oil tank or reservoir 26. Release of the return current 28 is effected during disengagement of the clutch by an electrical pulse of the contact associated with the clutch control such as the clutch pedal. Renewed release of the oil current 27 is effected by a second contact associated with the transmission control such as a shift lever.

While a specific embodiment of the invention has been shown and described in detail to illustrate the application of the inventive principles, it will be understood that the invention may be embodied otherwise without departing from such principles.

What is claimed is:

1. A clutch system for a motor vehicle including an engine and a manually shiftable transmission comprising:
    a friction disc clutch including at least one clutch disc;
    a releasing mechanism movable relative to said friction disc clutch for engagement and disengagement of said friction disc clutch;
    an oil reservoir for containing an oil supply;
    an oil pump held in said releasing mechanism and connected by means of a flexible hose with said oil reservoir;
    a control valve held at said releasing mechanism and controllably connecting said oil pump with an oil outlet opening provided at said release mechanism;
    an oil collecting trough held at said friction disc clutch, said oil collecting trough feeding oil which emerges from said oil outlet to said friction disc clutch for cooling said clutch disc; and
    a control mechanism for controlling said control valve, said control mechanism having two electrical control contacts of which a first of said control contacts is adapted to be activated in dependence upon the position of said release mechanism for generating a control pulse during disengagement of said clutch and for switching said control valve into a position in which it blocks said oil outlet opening, and a second control contact which in dependence on the gear position of said transmission operates to produce a control pulse when said transmission is shifted into transmitting engagement, said pulse operating to switch said control valve into the position in which the oil outlet is released.

2. A clutch system according to claim 1 wherein said control valve is constructed as a pneumatically controllable control valve having a control input connected with a compressed air source by means of an electrically controlling compressed air valve, said electrically controlling compressed air valve being adapted to be controlled in dependence upon the control pulses of said electrical control contacts.

3. A clutch system for a motor vehicle including an engine and a manually shiftable transmission comprising:
    a clutch having at least one clutch disc adapted to be engaged and disengaged for controlling power transmission between said engine and said transmission;
    operating means for engaging and disengaging said clutch;
    lubricant supply means for supplying lubricant to said clutch;
    valve means operable to be switched between a first position at which lubricant is directed from said supply means to said clutch and a second position at which lubricant is diverted away from said clutch; and
    control means for controlling operation of said valve means in accordance with the position of said clutch, said control means comprising
        first sensor means responsive to said transmission means for switching said control means to said first position to direct lubricant to said clutch when said clutch is engaged and
        second sensor means responsive to said operating means to switch said control means to said second position to divert lubricant away from said clutch when said clutch is disengaged.

* * * * *